United States Patent
Kumar et al.

(10) Patent No.: US 9,954,807 B2
(45) Date of Patent: *Apr. 24, 2018

(54) ENDORSEMENT INDICATIONS IN COMMUNICATION ENVIRONMENTS

(71) Applicant: Microsoft Technology Licensing, LLC, Redmond, WA (US)

(72) Inventors: Santosh Kumar, Sammamish, WA (US); Giselli Panontini DeSouza Sana, Redmond, WA (US); Alisson Teixeira, Seattle, WA (US); Amit Gupta, Redmond, WA (US); Cindy Kwan, Bellevue, WA (US); Sangya Singh, Redmond, WA (US); Naresh Sundaram, Redmond, WA (US); Johannes Gehrke, Bellevue, WA (US); Jason Cook, Bellevue, WA (US); Victoria Mbabazi, Redmond, WA (US); Ryan Murphy, Redmond, WA (US); Skye Pazuchanics, Woodinville, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 120 days.

This patent is subject to a terminal disclaimer.

(21) Appl. No.: 14/737,805

(22) Filed: Jun. 12, 2015

(65) Prior Publication Data

US 2016/0269333 A1    Sep. 15, 2016

Related U.S. Application Data

(60) Provisional application No. 62/131,816, filed on Mar. 11, 2015.

(51) Int. Cl.
 *H04L 12/58*  (2006.01)
 *G06Q 50/00*  (2012.01)
 (Continued)

(52) U.S. Cl.
 CPC ............ *H04L 51/16* (2013.01); *G06F 3/0482* (2013.01); *G06F 3/04842* (2013.01);
 (Continued)

(58) Field of Classification Search
 CPC ....... H04L 51/16; H04L 51/22; H04L 12/584; G06F 3/0482; G06F 3/04842; G06Q 10/107; G06Q 50/01
 See application file for complete search history.

(56) References Cited

U.S. PATENT DOCUMENTS 7,389,243 B2   6/2008  Gross
8,024,412 B2   9/2011  McCann et al.
(Continued)

FOREIGN PATENT DOCUMENTS

EP   2475138 A1    7/2012
JP   2006295639 A * 10/2006   ............ H04M 11/06
WO   9829994 A1    7/1998

OTHER PUBLICATIONS

Deefit, "How many levels of love_like_dislike do you need", Fragrantica Club, Oct. 1, 2013, p. 3, total 10 pages.*
(Continued)

*Primary Examiner* — Arvin Eskandarnia
*Assistant Examiner* — Amy Ling
(74) *Attorney, Agent, or Firm* — Turk IP Law, LLC

(57) ABSTRACT

Communication services enable two or more users to communicate electronically using multiple modes of communication. Conversations between groups of users are common, where one or more communications may be exchanged repeatedly over a period of time. In some scenarios, a
(Continued)

communication desired to be conveyed by a participant in a conversation may be a simple endorsement, such as receipt acknowledgment and various levels of social activity actions and/or gestures, which may be useful for other participants of the conversation to see as well. Provision of endorsement indications in communication environments may enable the participant to select an endorsement for a communication or a conversation without explicitly replying to the communication or conversation, where an endorsement indication based on the selected endorsement may be transmitted and displayed to the other participants of the conversation through an endorsement module of the communication service.

18 Claims, 9 Drawing Sheets

(51) Int. Cl.
  *G06Q 10/10* (2012.01)
  *G06F 3/0484* (2013.01)
  *G06F 3/0482* (2013.01)
(52) U.S. Cl.
  CPC .......... *G06Q 10/107* (2013.01); *G06Q 50/01* (2013.01); *H04L 51/08* (2013.01); *H04L 51/32* (2013.01)

(56) References Cited

U.S. PATENT DOCUMENTS

| | | | |
|---|---|---|---|
| 8,255,468 | B2 | 8/2012 | Vitaldevara et al. |
| 8,700,717 | B2 | 4/2014 | Buchheit et al. |
| 2008/0040126 | A1 | 2/2008 | Estrada et al. |
| 2009/0204679 | A1 | 8/2009 | Mitomo et al. |
| 2011/0010182 | A1 | 1/2011 | Turski et al. |
| 2011/0069668 | A1* | 3/2011 | Chion ................... H04L 1/1829 370/329 |
| 2012/0005203 | A1 | 1/2012 | Brzozowski et al. |
| 2012/0173633 | A1 | 7/2012 | Balabhadrapatruni et al. |
| 2012/0231770 | A1* | 9/2012 | Clarke ................ H04L 12/5885 455/414.1 |
| 2012/0303561 | A1 | 11/2012 | Sathish |
| 2013/0031183 | A1 | 1/2013 | Kumar et al. |
| 2013/0044959 | A1 | 2/2013 | Mitchell et al. |
| 2013/0073972 | A1 | 3/2013 | Yung et al. |
| 2013/0151611 | A1 | 6/2013 | Graham et al. |
| 2014/0143228 | A1* | 5/2014 | Blue .................. G06F 17/30867 707/709 |
| 2014/0171129 | A1 | 6/2014 | Benzatti et al. |
| 2014/0172996 | A1 | 6/2014 | Deeter et al. |
| 2014/0282084 | A1 | 9/2014 | Murarka et al. |
| 2014/0289258 | A1 | 9/2014 | Joshi et al. |
| 2014/0297816 | A1* | 10/2014 | Rodrigues ............... H04L 67/06 709/219 |
| 2014/0325391 | A1* | 10/2014 | Zhang ..................... H04L 51/04 715/753 |
| 2014/0330913 | A1 | 11/2014 | Pascal |
| 2015/0188873 | A1* | 7/2015 | Halliday ................. H04L 51/32 709/206 |
| 2016/0117749 | A1* | 4/2016 | Desmarais ............. A41H 3/007 382/111 |
| 2016/0253715 | A1 | 9/2016 | Xie et al. |

OTHER PUBLICATIONS

"International Search Report and Written Opinion Issued in PCT Application No. PCT/US2016/021418", dated May 2, 2016, 13 Pages.

Gonzaga, Stef, "10 Action-Based Email Apps to Achieve Inbox Zero", Published on: Sep. 18, 2013, Available at: http://iphone.appstorm.net/roundups/productivity-roundups/10-action-based-email-apps-to-achieve-inbox-zero/.

"Flow—Comment Liking", Published on: Jul. 3, 2014 Available at: https://www.getflow.com/support/tasks/comment_liking/.

"CloudMagic Email", Retrieved on: Apr. 17, 2015, Available at: https://play.google.com/store/apps/details?id=com.cloudmagic.mail&hl=en.

"Second Written Opinion Issued in PCT Application No. PCT/US2016/021418", dated Feb. 20, 2017, 9 Pages.

"International Preliminary Report on Patentability Issued in PCT Application No. PCT/US2016/021418", dated May 24, 2017, 10 Pages.

* cited by examiner

ENDORSEMENT INDICATIONS IN COMMUNICATION ENVIRONMENTS

CROSS-REFERENCE TO RELATED APPLICATION

This application claims benefit under 35 U.S.C § 119 (e) of U.S. Provisional Application Ser. No. 62/131,816 filed on Mar. 11, 2015. The Provisional application is herein incorporated by reference in its entirety.

BACKGROUND

Communication service and/or applications enable two or more users to communicate electronically using multiple modes of communication such as email, text messaging, media exchange, audio communication, video communication, desktop sharing, data sharing, application sharing, and similar modes. Some communication services and/or applications include additional functionality such as scheduling, contact list management, task management and comparable ones. Conversations between groups of users are common, where emails, other communications, and data are exchanged repeatedly over a period of time. In some scenarios, a message desired to be conveyed by a participant in a conversation may be a simple endorsement or acknowledgment, which may be useful for other participants to see as well. However, a reply or reply-all type communication would cause an entire message to be resent to all participants causing unnecessary network bandwidth and data storage consumption, as well as imposing a mental burden of an entire email message or conversation on the recipients.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to provision of endorsement indications in communication environments. A recipient of an exchanged communication may be enabled to select an endorsement for an exchanged communication through a communication user experience associated with the recipient that displays one or more exchanged communications within the conversation. An endorsement indication based on the selected endorsement may be transmitted to a sender and one or more other recipients of the exchanged communication over a designated communication channel, and display of the endorsement indication may be enabled through communication user experiences associated with the sender and the one or more other recipients of the exchanged communication.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

Figure 1:
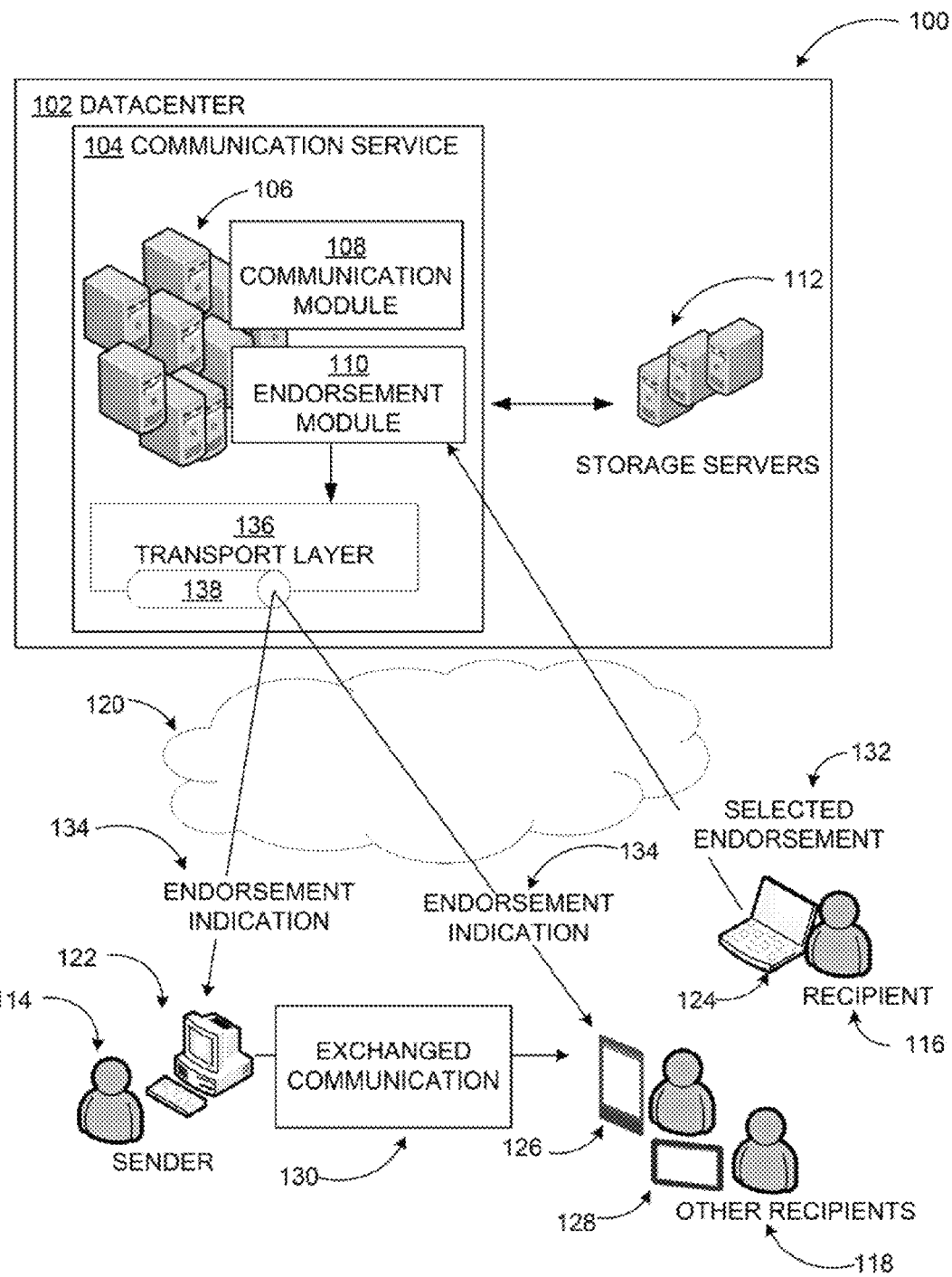
FIG. 1 includes a conceptual diagram illustrating an example communication environment where endorsement indications may be provided.

As briefly described above, a response to a communication desired to be conveyed by a participant in a conversation may be a simple endorsement, which may be useful for other participants of the conversation to see as well. Endorsements in communication environments, ranging from receipt acknowledgment to various levels of social activity actions, may enable the participant to convey such an acknowledgement and/or social activity action for the communication without explicitly replying. An endorsement indication based on a selected endorsement may then be transmitted to the other participants of the communication or conversation, and displayed through communication user experiences associated with the other participant in order to provide notification of the endorsement to the other participants. Various other endorsement-related data may be displayed as properties of the communication or conversation, such as an endorsement count indicating a number of endorsements associated with each communication or conversation, and an endorser list indicating names of participants who have selected the endorsements for each communication or conversation.

In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While the embodiments will be described in the general context of program modules that execute in conjunction with an application program that runs on an operating system on a computing device, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium is a computer-readable memory device. The computer-readable memory device includes a hardware device that includes a hard disk drive, a solid state drive, a compact disk, and a memory chip, among others. The computer-readable storage medium can for example be implemented via one or more of a volatile computer memory, a non-volatile memory, a hard drive, and a flash drive.

Throughout this specification, the term "platform" may be a combination of software and hardware components to provide a communication application or service with endorsement indications. Examples of platforms include, but are not limited to, a hosted service executed over a plurality of servers, an application executed on a single computing device, and comparable systems. The term "server" generally refers to a computing device executing one or more software programs typically in a networked environment. However, a server may also be implemented as a virtual server (software programs) executed on one or more computing devices viewed as a server on the network. More detail on these technologies and example embodiments may be found in the following description.

An endorsement, as used herein, refers to one of a receipt acknowledgement of a communication and/or a social activity action associated with the communication, such as a mention, and a like or a dislike at various levels (e.g., like, like much, like very much, etc.) selected by a participant of the communication. An endorsement indication, as used herein, refers to a brief message or notification transmitted to one or more other participants of the communication, indicating the participant's receipt acknowledgment of the communication and/or a social activity selected by the participant. The endorsement indications are not limited to the examples provided herein. Similarly, communications in which endorsement indications may be used are not limited to emails or comparable text-based messaging. Indeed, any form of electronic communication medium may be used to implement endorsement indications.

FIG. 1 includes a conceptual diagram illustrating an example communication environment, where endorsement indications may be provided. As illustrated in diagram 100, an example system may include a datacenter 102 hosting a communication service 104 configured to provide communication-based services to users in various modalities such as email, text messaging, audio/video conferencing, application sharing, desktop sharing, and the like. The communication service 104 may include one or more processing servers 106, of which, at least one may be operable to execute a communication module 108 and an endorsement module 110, among other modules. The communication service 104 may also include a transport layer 136 configured to facilitate an exchange of various types of communication related data. The datacenter 102 may also include one or more storage servers 112 configured to manage one or more data stores comprising data associated with the communication module 108 and the endorsement module 110. As described herein, the modules of the communication service 104 may be implemented as software, hardware, or combinations thereof.

As illustrated in the diagram 100, the endorsement module 110 may be an integral part of the communication service 104. A client may be a thin client (e.g., a web browser) or a thick (e.g., a locally installed client application) client, enabling a participant of a conversation, such as a sender 114 or one or more recipients 116, 118, to access the communication service 104 over one or more networks such as network 120 via execution of the thin or thick client through an associated computing device. The associated computing device may include a desktop computer 122, a laptop computer 124, a tablet computer 126, a vehicle mount computer, a smart phone 128, or a wearable computing device, among other similar devices. If the client is a thin client, the endorsement module 110 of the communication service 104 may be configured to provide endorsement indications. If the client is a thick client, the thick client may include a separate, corresponding endorsement module that works in conjunction with the endorsement module 110 of the communication service 104 to provide endorsement indications, for example. Alternatively, the endorsement module 110 may not be an integral pan of the communication service 104. Instead, the thick client may have a separate endorsement module communicatively coupled to the endorsement modules of other thick clients to facilitate provision of endorsement indications among participants of the conversation.

In an example embodiment, the communication module 108 of the communication service 104 may facilitate an exchange of one or more communications within a conversation between participants of the conversation. For example, the communication module 108 may facilitate exchange of a communication 130 between the sender 114 and the recipients 116, 118. The exchanged communication 130 may be an email exchange, a text message exchange, an online conference, an audio communication, a video communication, an application sharing session, a desktop sharing session, or a data sharing session, for example. A communication user experience associated with the communication service 104 may be configured to display the exchanged conversations and/or communications associated with an individual mailbox of a user, such as the sender 114 or the recipients 116, and/or a shared mailbox between multiple users. The mailbox may be a server, for example, configured to store exchanged communications, including both received and sent communications, as well as draft communications and deleted communications, among other communications.

The endorsement module 110 of the communication service 104 may enable a recipient 116 of the exchanged communication 130 to select an endorsement 132 for the exchanged communication 130 through a communication user experience associated with the recipient 116. The selected endorsement 132 may include a receipt acknowledgement and/or a social activity action associated with the exchanged communication 130. The social activity action may include a like, a dislike, and/or a mention, for example, where the recipient 116 may be enabled to select various levels of like and dislike (for example, like, like much, and like very much). The endorsement module 110 may transmit an endorsement indication 134 based on the selected endorsement 132 to the sender 114 and the other recipients 118 of the exchanged communication over a designated communication channel 138. The endorsement module 110 may then enable display of the endorsement indication 134 through communication user experiences associated with the sender 114 and the one or more other recipients 118 of the exchanged communication 130. The endorsement module 110 may display the endorsement indication 134 as a message or a notification that may include identifying information such as the recipient 116, the selected endorsement 132, the exchanged communication 130, a group associated with the exchanged communication 130, if applicable, and/or a time elapsed from the selection of the endorsement, for example.

In some embodiments, the endorsement indication 134 may be aggregated with one or more other endorsement indications for the exchanged communication 130 at a per communication level such that the sender 114 and the recipients 116, 118 are only notified when a new endorsement is selected for the exchanged communication 130. In some examples, the notification may be based on a last time the sender 114 and the recipients 116, 118 acknowledged a displayed endorsement indication. The sender 114 and/or the other recipients 118 may be enabled to preview the selected endorsement 132 for the exchanged communication 130 and various other activity associated with the exchanged communication 130 through the displayed endorsement indication 134. The sender and/or the other recipients 118 may also be enabled to navigate to the exchanged communication 130 by selecting the displayed endorsement indication 134.

In some embodiments, the endorsement module 110 may also display endorsement-related data through the communication experiences associated with the sender 114 and the recipients 116, 118. For example, an endorsement count indicating a number of endorsements associated with the exchanged communication 130 and/or an endorsement count indicating a number of endorsements associated with the conversation may be displayed. Additionally, an endorser list indicating names of the sender 114 and/or the recipients 116, 118 selecting each of the endorsements for the exchanged communications may be displayed. The endorsement-related data may be displayed in conjunction with the exchanged communication 130 in a communication list view and/or in a separate reading pane that provides a summary of endorsements, endorsement counts, and endorser lists for the exchanged communication 130, for example.

As discussed briefly above, the endorsement module 110 may transmit the endorsement indication 134 to the sender 114 and the other recipients 118 of the exchanged communication over the designated communication channel 38. The designated communication channel 138 may be a control messaging channel in the transport layer 136 of the communication service 104, for example. The endorsement indication 134 may be distributed to individual mailboxes associated with each of the sender 114 and the other recipients 118. Alternatively, the endorsement indication 134 may be distributed to a shared mailbox associated with a group, for example, if the sender 114 and the other recipients 118 belong to a same group. To achieve such an endorsement indication exchange, a lightweight and reliable mechanism may be employed for inter-mailbox (server) communication. A transport stack that is used to deliver communications to mailboxes may be leveraged to use control messages as a reliable mechanism for inter-server communication. A standard format/schema for control messages may be employed that distinguishes it from normal communication items and contains other relevant data e.g. action to be performed and metadata associated with the action. For example, control messages may have actions associated with them as special transport delivery agents on the endpoint servers that contain the logic to process control messages for a specific action. In an example scenario, if the selected endorsement 132 is like, a like Agent may intercept a like control message with metadata and process the metadata to create a persisted like endorsement notification in a destination mailbox, such as the individual mailboxes of the sender 114 and the other recipients 118, and/or the shared mailbox of the group comprising the sender 114 and the other recipients 118. In other examples, processing of the control message by subsequent agents may be suppressed by the like agent to prevent the control message from ending up in an inbox associated with the sender 114 and the other recipients 118. To minimize impact of the control messages on service, during periods of high load, the processing/routing of these control messages may be de-prioritized by the transport stack in favor of delivering real communications.

Endorsement functionality may be provided across conversation client endpoints. In some examples, the endorsement module 110 may be configured as an extension to an API of the communication service 104 so any third party application may use the framework to build endorsement functionality by connecting to the communication distribution mechanism. As such, communication clients, via execution of the endorsement module 110, may enable selection of endorsements against any communication/conversation in a user mailbox, display of endorsement related data (such as endorsement counts and endorser lists), and transmission/receipt of endorsement indications for display.

Conversations between groups of users, such as the sender 114 and recipients 116, 118 illustrated in FIG. 1, are common, where communications may be exchanged repeatedly over a period of time. Provision of endorsement indications in communication environments, as described herein, may enable a user in the conversation to simply endorse or acknowledge an exchanged communication (which may be viewed by other users of the conversation through endorsement indications), instead of sending a reply or reply-all type communication that would cause the entire communication to be resent to the other users of the conversation causing unnecessary network bandwidth and data storage consumption. As such, provision of endorsement indications in communication environments may increase efficiency in network usage by reducing communication traffic, reduce processor usage by reducing need for repeated reply or reply all type communications, and reduce data storage need as the number of reply or reply all type communications stored in individual users' or group mailboxes may be reduced. Furthermore, provision of endorsement indications in communication environments may improve user efficiency as the users may be able to quickly select an endorsement without having to go through a reply process, and easily recognize endorsements selected by others through the endorsement indications displayed. User interaction performance may also be improved by enabling persistent presentation of endorsement indications and endorsement-related data in a conversation.

Embodiments, as described herein, address a need that arises from very large scale of operations created by networked computing and cloud based services that cannot be managed by humans. The actions/operations described herein are not a mere use of a computer, but address results of a system that is a direct consequence of software used as a service such as the communication service 104 offered in conjunction with large numbers of users and exchanged communications.

Figure 2A:
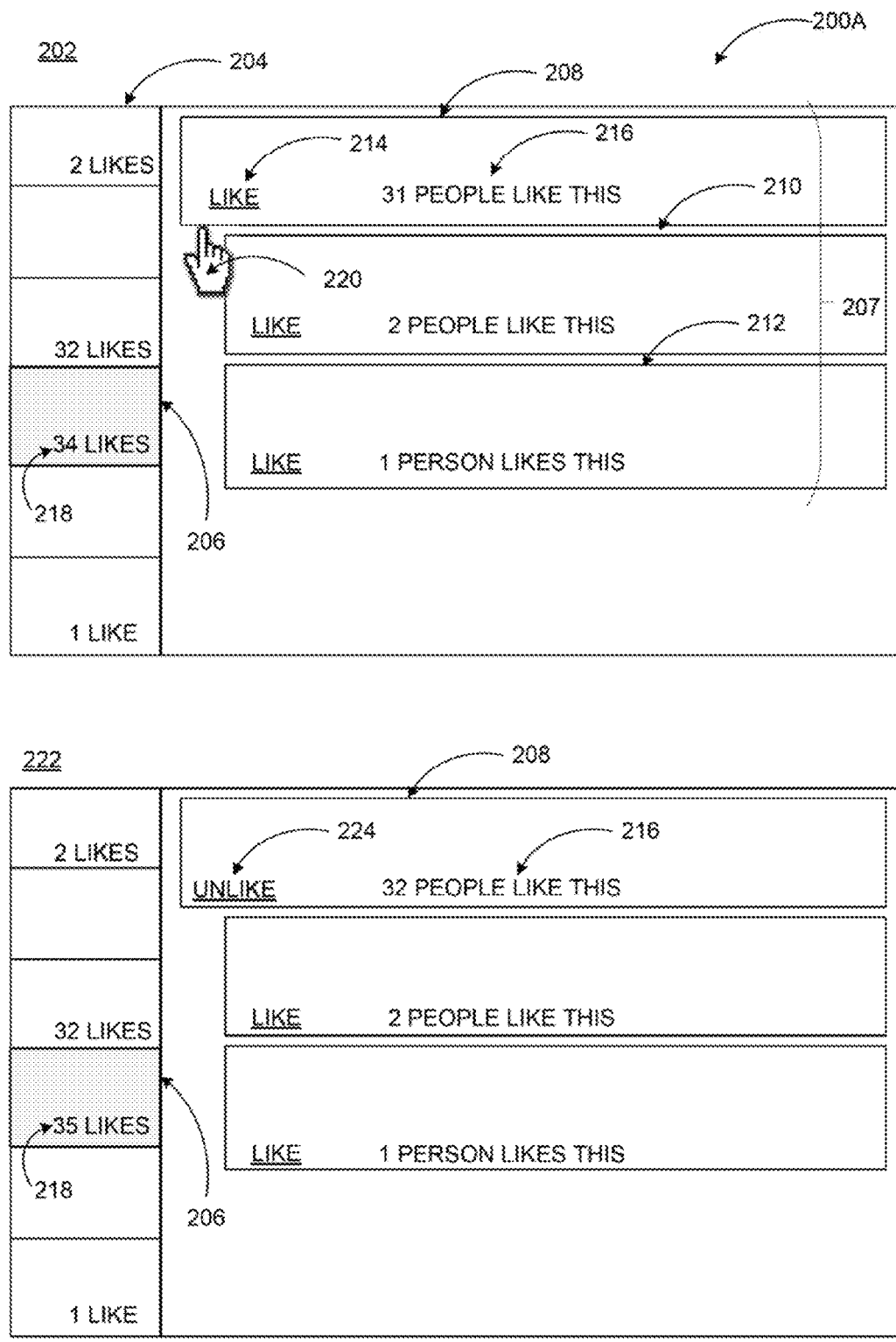
FIGS. 2A and 2B illustrate examples of simplified communication user experiences.
Figure 2B:
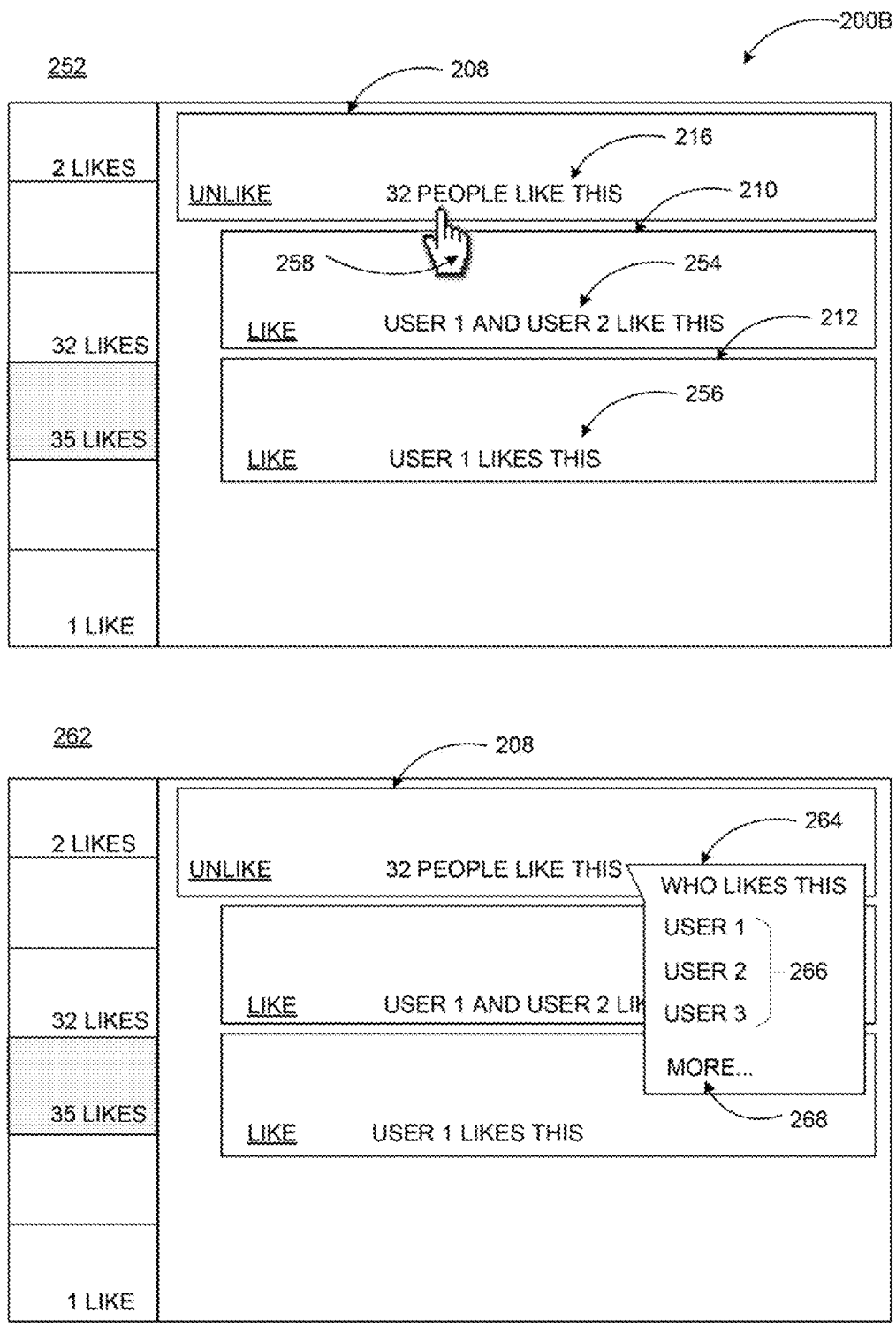

FIGS. 2A and 2B illustrate examples of simplified communication user experiences. A communication service may enable two or more users to communicate electronically using various modes of communication. The communication service may include a communication module configured to facilitate exchange of communications, and an endorsement module configured to provide endorsement indications for the exchanged communications, among other modules. A user experience associated with the communication service may be configured to display the exchanged communications and/or conversations associated with an individual mailbox of a user and/or a shared mailbox of multiple user in a group. The mailbox may be a server, for example, configured to store exchanged communications, including both received and sent communications, as well as draft communications and deleted communications, among other communications.

Configuration 202 of diagram 200A, illustrates an example communication user experience associated with a participant of a conversation 206. The communication user experience may display a conversation list view 204 that includes one or more conversations in which the participant is involved, such as the conversation 206. The communication user experience may also display a communication list view 207 comprising one or more exchanged communications within a conversation, when the conversation is selected from the conversation list view 204. For example, upon selection of the conversation 206, the communication user experience may display exchanged communications 208, 210, and 212 within the conversation 206 in the communication list view 207. One or more endorsement options 214 may be displayed in conjunction with each of the exchanged communications 208, 210, and 212. The endorsement options 214 may be provided for user selection based on past participant interactions with the exchanged communications 208, 210, and 212. For example, the participant may have not previously endorsed the exchanged communications 208, 210, and 212. Accordingly, an endorsement option 214 of like may be displayed. Alternatively, had the participant already liked one or more of the exchanged communications 208, 210, and 212, an endorsement option of unlike may be displayed. Other examples of endorsement options displayed may include acknowledge receipt, dislike, undislike, mention, and revoke mention, where some endorsement options (e.g., like and dislike) may also include various levels.

Each of the exchanged communications 208, 210, and 212 may also display an endorsement count 216 associated with the respective exchanged communication. For example, exchanged communication 208 may have thirty-one like endorsements, exchanged communication 210 may include two like endorsements, and exchanged communication 212 may include one like endorsement. Additionally, an endorsement count 218 for each conversation (that is, a sum of the number of endorsements for each of the exchanged communications within the conversation) may be displayed in the conversation list view 204. For example, the conversation 206 may have thirty-four endorsements, the sum of the number of endorsements for each of the exchanged communications 208, 210, and 212 within the conversation 206.

In an example scenario, the participant, a recipient of the exchanged communication 208, may be enabled to select an endorsement from the endorsement options through the communication user experience. For example, the participant may select 220 the endorsement option 214 of like for the exchanged communication 208. The endorsement selection may be persisted in the mailbox of the participant and the communication user experience may be updated accordingly, as illustrated in configuration 222 of diagram 200A.

For example, provided endorsement options for selection may be updated, the endorsement count 216 for the exchanged communication 208 may be incremented to thirty-two, and the endorsement count 218 for the conversation 206 may be incremented to thirty-five to reflect that the participant has liked the exchanged communication 208. The provided endorsement options may be updated to include an endorsement option 224 of unlike, for example, to indicate to the participant that he or she has already liked the exchanged connmmunication 208. The endorsement selection may be persisted across mailboxes associated with the other participants of the exchanged communication, such as a sender and one or more other recipients, in a similar manner.

Additionally, an endorsement indication based on the selected endorsement may be transmitted to the other participants of the exchanged communication 208 by distributing the endorsement indication to respective individual mailboxes associated with the other participants and/or a shared mailbox associated with the other participants. The endorsement indication may be displayed as one of a message and a notification through communication user experiences associated with the other participants, where the endorsement indication may include identifying information such as the endorser (the participant), the selected endorsement (like), the exchanged communication 208, a group associated with the exchanged communication 208, if applicable, and/or a time elapsed from the selection of the endorsement, for example. In some embodiments, the endorsement indication may be persisted in respective individual mailboxes associated with the other participants of the exchanged communication, such that the endorsement indication may be consumable later for participants whose thin and/or thick clients, as described in conjunction with FIG. 1, are not in an online mode.

Configurations 252 and 262 of diagram 200B illustrate further functionalities of the communication user experience. In response to a determination that an endorsement count for an exchanged communication is less than a predetermined integer (n), the displayed endorsement count may be replaced with names of the participants that have selected each endorsement. For example, exchanged communication 210 includes two endorsements and exchanged communication 212 includes one endorsement, where two and one may be less than n, respectively. As such, names of the two participants 254 that have selected each of the two endorsements may be displayed in conjunction with the exchanged communication 210, and a name of the participant 256 that selected the endorsement may be displayed in conjunction with the exchanged communication 212. Contrastingly, exchanged communication 208 includes thirty-two endorsements, where thirty-two may be greater than n. As such, the endorsement count 216 may be displayed in conjunction with the exchanged communication 210. However, the participant may hover over and/or select 258 the endorsement count 216 for the exchanged communication 208 in order for names of the participants that have selected the endorsements to be displayed.

For example, in response to detecting the hover over and/or selection 258 of the endorsement count 216 for the exchanged communication 208, a menu 264 may be displayed, as illustrated in configuration 262. The menu 264 may include an endorser list that includes names of participants 266 who have endorsed the exchanged communication 208. The menu 264 may be a pop-up menu or a drop-down menu, for example. Depending on a number of participants who have endorsed the exchanged communication 208, a control element 268 may be utilized to conserve display space on the communication user experience. For example, the menu 264 may display a limited number of names in the list, and upon selection of the control element 268 additional names may be displayed. Alternatively, the menu 264 may have scrolling functionality to conserve display space on the communication user experience.

To enable persistence and communication user experience updates, as described above, the endorsements may be stored according to various models. In a first example model, endorsement related properties such as the endorsement count and the endorser list may be added to the exchanged communication 208. The endorsement count may be stored as an on-page property and the endorser list may be stored as a dynamic on-page or off-page property dependent on size, where the endorser list may represent each endorser based on the globally unique identifier of the participant/user from a directory service associated with the communication service. When the endorser list is displayed through the communication user experience the globally unique identifiers may be converted to names of the participants/users. In some embodiments, a Boolean flag for the exchanged communication 208 may be used within a mailbox when the user associated with the mailbox is the endorser of the exchanged communication 208, such that the communication service does not to have to go off-page when retrieving exchanged communications for individual mailboxes regardless of the size of the endorser list.

In a second example model, the endorsement may be added (or removed if the user unlikes the exchanged communication 208, for example), as an entry/row to a table comprising three columns <ConversationId, MessageId, User>. To determine an endorsement count and endorser list associated with the exchanged communication 208, a query may be issued to the table. For example, to retrieve a number of endorsements for the exchanged communication 208, a query for rows matching a <ConversationId> associated with the exchanged communication 208 may be issued, and the row count may be aggregated per <MessageId> associated with the exchanged communication 208. To retrieve the endorser list for the exchanged communication 208, the table may be queried by <ConversationId, MessageId> associated with the exchanged communication 208, where if the number of endorsers is less than n, the endorsement count may be replaced with user names retrieved from the table.

In a third example model, the endorsement count and endorser list may be stored on the exchanged communication 208. The endorsement count may be stored as an on-page property and the endorser list may be stored as an off-page property. A Boolean flag for the exchanged communication 208 may be used within a mailbox when the user associated with the mailbox endorses the exchanged communication 208, where the flag may be stored as an on-page property.

Figure 3A:
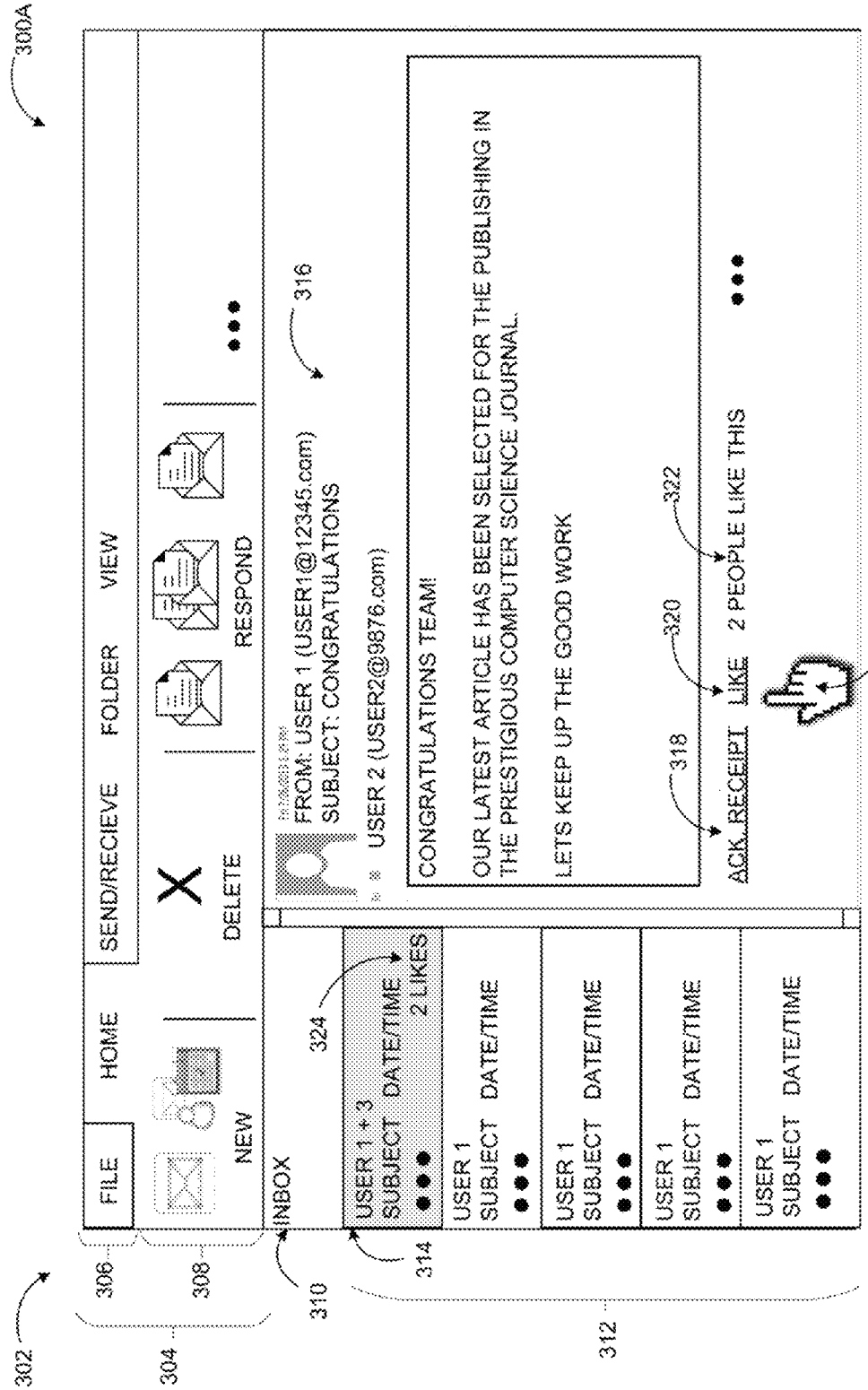
FIGS. 3A and 3B illustrate an example endorsement selection through a communication user experience.
Figure 3B:
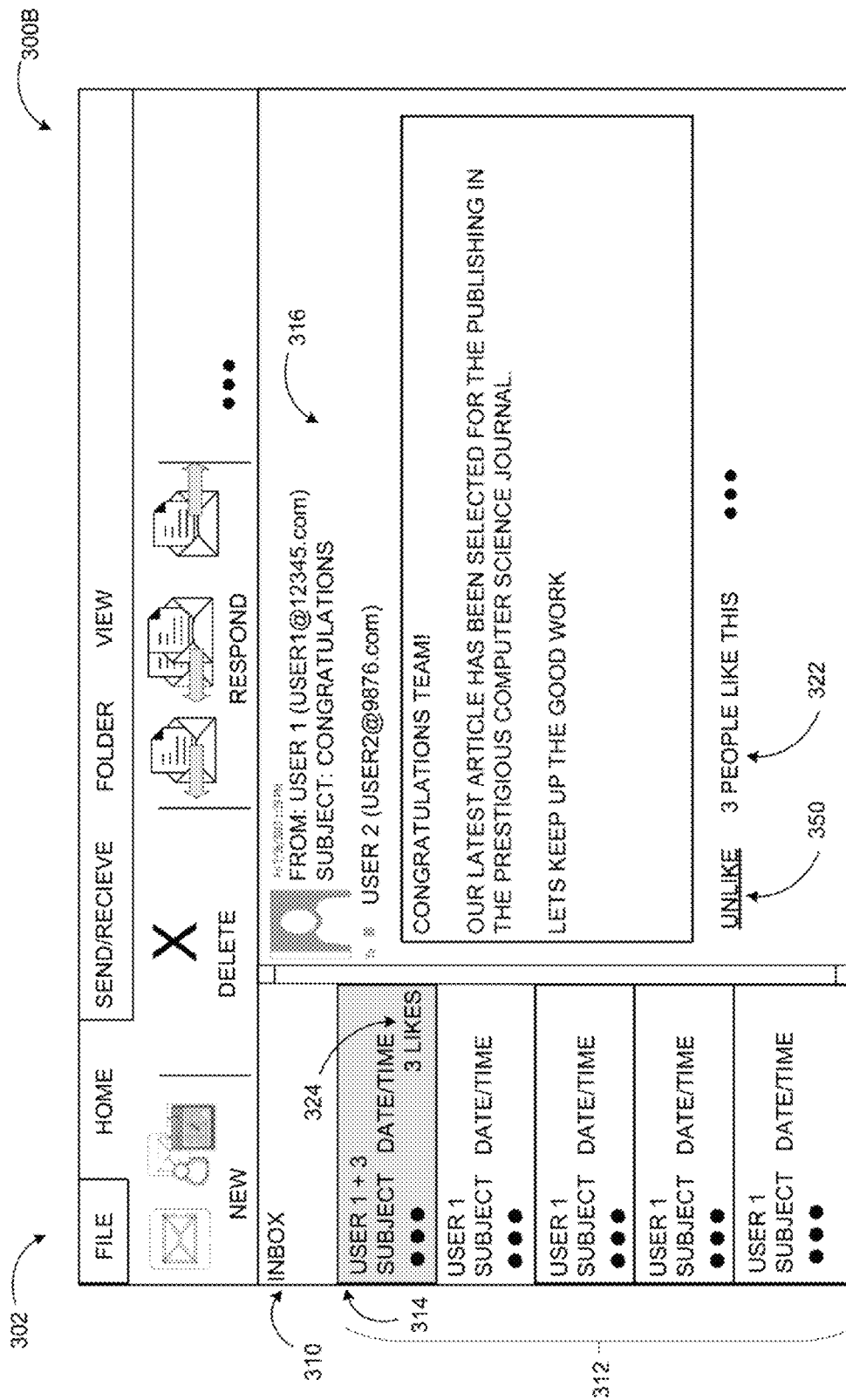

FIGS. 3A and 3B illustrate an example endorsement selection through a communication user experience. A communication service may enable two or more users to communicate electronically using various modes of communication. The communication service may include a communication module configured to facilitate exchange of one or more communications between participants of a conversation, and an endorsement module configured to provide endorsement indications for the exchanged communications, among other modules.

As shown in diagram 300A, a communication user experience 302 associated with a user may include a command bar 304 to enable user interactivity with the communication service. The command bar 304 may employ a textual scheme, a graphical scheme, an audio scheme, an animation scheme, a coloring scheme, a highlighting scheme, and/or a shading scheme, among other schemes, to enhance presentation to the user. The command bar 304 may include one or more tabs 306, such as a file tab, a home tab, a send/receive tab, a folder tab, and a view tab, among other examples. Each of the tabs 306 may include one or more groups 308 comprising graphical control elements that enable the user to perform various actions associated with one or more modules of the communication service. In some examples, the graphical control elements may be associated with icons and/or text-based labels, where the labels may indicate an action associated with the graphical control element.

The communication user experience 302 may also display conversations and/or communications associated with an individual mailbox of the user, where the mailbox may be a server configured to store exchanged communications, including both received and sent communications, as well as draft communications and deleted communications, for example. The mailbox may be configured to store these various communications in categorized folders, such as an inbox, an outbox, sent items, draft items, and deleted items. In some embodiments, a communication may be stored with one or more other communications within a same conversation. The communication user experience 302 may display the conversations and/or communications stored in each folder. For example, the communication user experience 302 may display conversations comprising one or more received communications stored in the inbox 310 in a conversation list view 312. Upon user selection of one of the conversations, such as conversation 314, the one or more communications within the conversation 314, such as email message 316, may be displayed.

The endorsement module of the communication service may enable the user, who is a recipient of the email message 316, for example, to endorse the email message 316 through the communication user experience 302. For example, the endorsement module may enable provision and display of various endorsement options for user selection, such as acknowledge receipt 318 and/or social activity actions, including like 320, dislike, and/or mention in conjunction with the email message 316. In some embodiments, the endorsements provided/displayed for user selection may be inferred, and thus may be considered endorsement suggestions. Endorsement related user interactions associated with past exchanged communications that include similar attributes to the email message 316 may be used to infer the endorsements provided/displayed for user selection, for example. The attributes may include a sender, one or more recipients, key words in a subject, a size of the subject, key words in a body, a size of the body, and/or a number of attachments, among other examples. In one example scenario, the user may have consistently selected an acknowledge receipt endorsement for past exchanged communications sent by a particular sender. Accordingly, if the email message 316 was sent by the particular sender, the endorsement module may provide/display an acknowledge receipt 318 endorsement option for potential user selection within the email message 316.

The endorsement module may also enable display of an endorsement count 322 for the email message 316 indicating a number of endorsements associated with the email message 316. In some examples, an endorsement count 324 for a conversation may be displayed in the conversation list view 312, where the endorsement count may be a sum of the number of endorsements associated with each communication of the conversation). As illustrated in diagram 300A, the email message 316 may be associated with two endorsements, and as the email message 316 is the only communication of the conversation 314, the endorsement count 324 associated with the conversation 314 is also two.

In response to the user selection 326 of the like 320 endorsement option, the like 320 may be persisted in the mailbox of the user and the communication user experience 302 may be updated accordingly, as illustrated in configuration diagram 300B. For example, the endorsement options for user selection may be updated to modify an endorsement option of like to an endorsement option of unlike 350 to reflect that the user has previously liked the email message 316. Additionally, the acknowledge receipt endorsement option may be removed, as this type of endorsement would be redundant in light of the fact that the user has already liked the email message 316. Furthermore, the endorsement count 322 for the email message 316 may be incremented to three, and the endorsement count 324 for the conversation 314 may be incremented to three to reflect that the user has liked the email message 316. The endorsement selection may be persisted across mailboxes associated with other users participating in the email message 316 and/or conversation 314, such as a sender and one or more other recipients, in a similar manner.

In some scenarios, the user may wish to revoke the like endorsement selected for the email message 316. In such scenarios, the user may be enabled to select the unlike 350 endorsement option. The endorsement selection may be persisted in the mailbox of the user and the communication user experience 302 updated accordingly. For example, the communication user experience may return to a state as described in diagram 300A.

Figure 4:
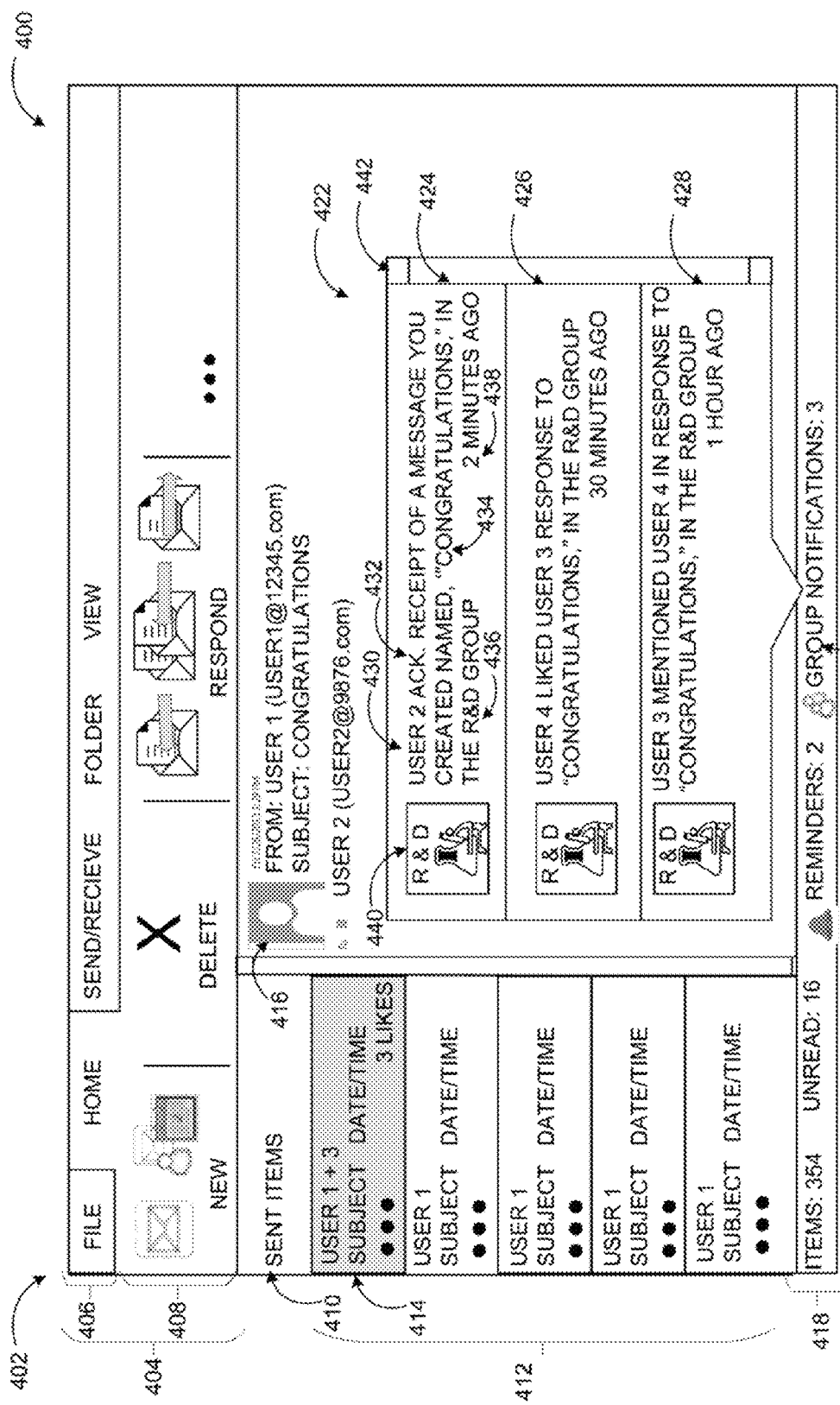
FIG. 4 illustrates an example of endorsement indications displayed through a communication user experience.

FIG. 4 illustrates an example of endorsement indications displayed through a communication user experience. A communication service may enable two or more users to communicate electronically using various modes of communication. The communication service may include a communication module configured to facilitate exchange of one or more communications between participants of a conversation, and an endorsement module configured to provide endorsement indications for the exchanged communications, among other modules.

As previously discussed in conjunction with FIG. 3A, a communication user experience 402 associated with a user, as shown in diagram 400, may include may include a command bar 404 to enable user interactivity with the communication service. The command bar 404 may include one or more tabs 406, and each of the tabs 406 may include one or more groups 408 comprising graphical control elements that enable the user to perform various actions associated with one or more modules of the communication service. The communication user experience 402 may also display conversations and/or communications associated with an individual mailbox of the user and/or a shared mailbox of a group to which the user belongs, where the mailbox may be a server configured to store exchanged communications, including both received and sent communications, as well as draft communications and deleted communications, for example. The mailbox may be configured to store these various communications in categorized folders, such as an inbox, an outbox, sent items, draft items, and deleted items, where a communication may be stored with one or more other communications within a same conversation. The communication user experience 402 may display the conversations and/or communications stored in each folder. For example, the communication user experience 402 may display sent communications stored in the sent items folder 410 in a conversation list view 412 based on respective conversations the sent communications are within. Upon user selection of one of the conversations, such as conversation 414, the one or more communications within the conversation 414, such as email message 416, may be displayed. The communication user experience 402 may also include a notification bar 418 to further enhance user interactivity with the communication service. The notification bar 418 may include various notifications, such as a number of communications within the mailbox, a number of unread communications, reminders, and/or group notifications 420. The notification bar 418 may employ a textual scheme, a graphical scheme, an audio scheme, an animation scheme, a coloring scheme, a highlighting scheme, and/or a shading scheme, among other schemes, to enhance presentation to the user.

In an example scenario, the user associated with the communication user experience 402 may send a communication, such as the email message 416 titled "Congratulations", to multiple recipients in a group, such as a research and a design (R&D) group, where a communication module of the communication service may facilitate exchange of communication. One of the recipients may select an endorsement for the exchanged communication, such as a receipt acknowledgement, through a communication user experience associated with the recipient. The endorsement module of the communication service may be configured to transmit an endorsement indication 424 based on the selected endorsement to the user (as well as the other recipients) over a designated communication channel. For example, the endorsement indication 424 may be distributed to individual and/or shared mailboxes of the user and the other recipients. In some embodiments, the endorsement indication 424 may be persisted in respective individual mailboxes associated with the sender and the other recipients of the exchanged communication, such that the endorsement indication 424 may be consumable later for sender/recipients whose thin and/or thick clients, as described in conjunction with FIG. 1, are not in an online mode.

The endorsement module may then enable display of the endorsement indication 424 through the communication user experience 402. The user may be enabled to preview the selected endorsement for the exchanged communication through the displayed endorsement indication 424. For example, the endorsement indication 424 may be displayed in a notification menu 422, or other type of viewing/reading pane, automatically upon receipt of the endorsement indication 424. Alternatively, the endorsement indication 424 may be displayed in the notification menu 422 in response to a user selection of the group notifications 420, control element on the notification bar 418. In some examples, the notification menu 422 may have scrolling functionality 442 to conserve display space on the communication user experience 402. The endorsement indication 424 may be displayed in conjunction with one or more other endorsement indications 426 and 428. For example, the endorsement indications 424, 426, and 428 may be displayed in a chronological order, with the most recently received endorsement indication (endorsement indication 424) at the top of the notification menu 422. The other endorsement indications 426 and 428 may be for a same exchanged communication, as illustrated, or may be for different exchanged communications within a same conversation. Alternatively, the other endorsement indications 426 and 428 may be for exchanged communications within other conversations the user is a participant of. The endorsement indications 424, 426, and 428 may be aggregated at per communication level such that the user may be notified only when a new endorsement is selected for a communication. In some examples, the notification may be based on a last time the user acknowledged a displayed endorsement indication. In some embodiments, the user may be enabled to navigate directly to a communication by selecting a respective endorsement indication for the communication. For example, the user may select any of endorsement indications 424, 426, and 428 to navigate to the email message 416.

Each of the displayed endorsement indications 424, 426, and 428 may include various components, such as a name of the endorser 430, a type of endorsement 432 (such as a receipt acknowledgement, a like, and a mention, respectively), a name of the exchanged communication 434, a group name associated with the sender/recipients of the communication/conversation 436, if applicable, and a time passed since the endorsement was selected 438. In some embodiments, each of the endorsement indications 424, 426, and 428 may also include an icon 440 that may represent the group associated with the sender and recipients, as illustrated. In other embodiments, the icon 440 may represent the individual sender or recipient that selected the endorsement. For example, the icon may be a photograph and/or avatar of the endorser.

The example scenarios and schemas in FIG. 1 through 4 are shown with specific components, modules, data types, and user experience configurations. Embodiments are not limited to systems according to these example configurations. Providing endorsement indications in communication environments may be implemented in configurations employing fewer or additional components in applications/services and user experiences. Furthermore, the example schema and components shown in FIG. 1 through 4 and their subcomponents may be implemented in a similar manner with other values using the principles described herein.

Figure 5:
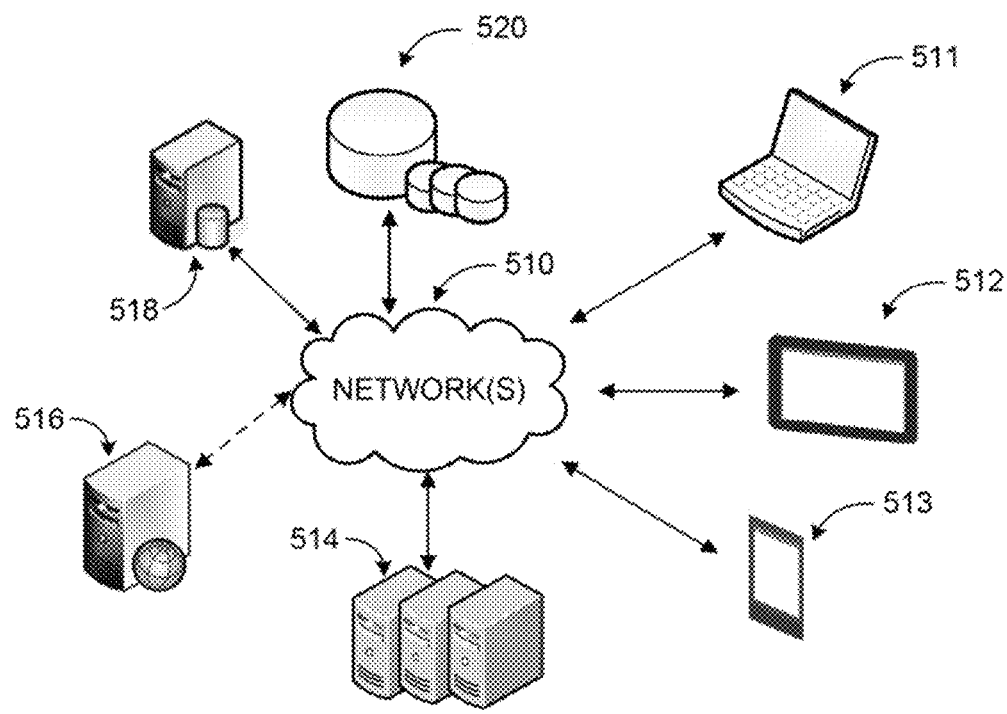
FIG. 5 is a simplified networked environment, where endorsement indications in communication environments may be provided according to embodiments.

FIG. 5 is an example networked environment, where embodiments may be implemented. A communication service may be implemented via software executed over one or more servers 514 such as a hosted service. The platform may communicate with client applications on individual computing devices such as a smart phone 513, a tablet 512, or a laptop computer 511 ('client devices') through network(s) 510.

Client applications executed on any of the client devices 511-513 may facilitate communications via application(s) executed by servers 514, or on individual server 516. A communication module of the communication service may be configured to facilitate exchange of one or more communications such as emails, text messages, online meeting notes/recording, attachments, contact information, calendar items, and similar ones as users communicate through the client devices 511-513, over network(s) 510. An endorsement module of the communication service may be configured to provide endorsement indications associated with the exchanged communications. The communication service may store data associated with is services, such as endorsement related data, in data store(s) 520 directly or through database server 518.

Network(s) 510 may comprise any topology of servers, clients, Internet service providers, and communication media. A system according to embodiments may have a static or dynamic topology. Network(s) 510 may include secure networks such as an enterprise network, an unsecure network such as a wireless open network, or the Internet. Network(s) 510 may also coordinate communication over other networks such as Public Switched Telephone Network (PSTN) or cellular networks. Furthermore, network(s) 510 may include short-range wireless networks such as Bluetooth or similar ones. Network(s) 510 provide communication between the nodes described herein. By way of example, and not limitation, network(s) 510 may include wireless media such as acoustic, RF, infrared and other wireless media.

Many other configurations of computing devices, applications, data sources, and data distribution systems may be employed to provide endorsement indications and notifications in communication environments. Furthermore, the networked environments discussed in FIG. 5 are for illustration purposes only. Embodiments are not limited to the example applications, modules, or processes.

Figure 6:
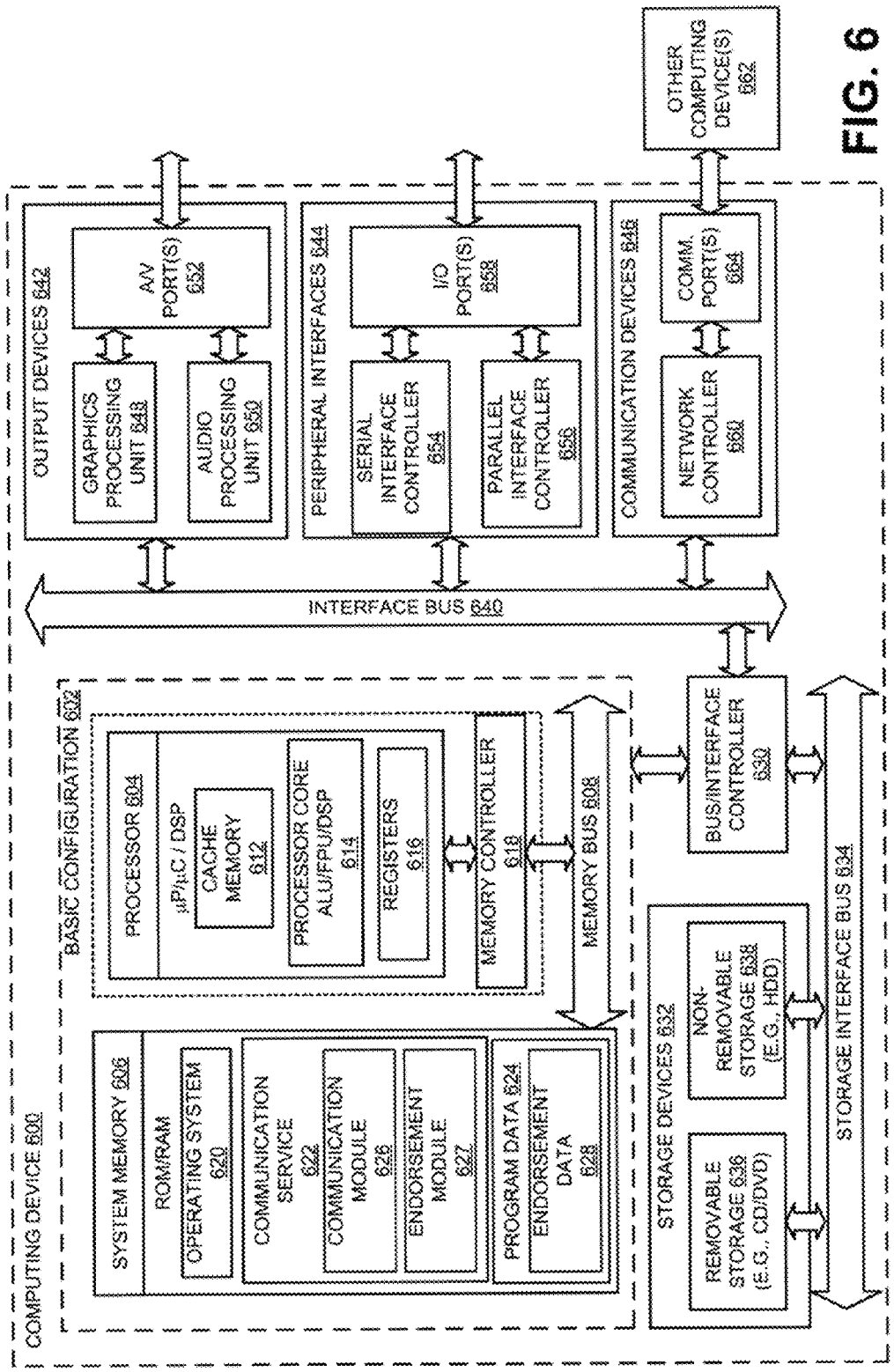
FIG. 6 illustrates a general purpose computing device, which may be configured to provide a communication service with endorsement indications according to embodiments.

FIG. 6 illustrates a general purpose computing device, which may be configured to provide endorsement indications in communication environments, arranged in accordance with at least some embodiments described herein.

For example, computing device 600 may be used as a server, desktop computer, portable computer, smart phone, special purpose computer, or similar device. In an example basic configuration 602, the computing device 600 may include one or more processors 604 and a system memory 606. A memory bus 608 may be used for communicating between the processor 604 and the system memory 606. The basic configuration 602 is illustrated in FIG. 6 by those components within the inner dashed line.

Depending on the desired configuration, the processor 604 may be of any type, including but not limited to a microprocessor ($\mu P$), a microcontroller ($\mu C$), a digital signal processor (DSP), or any combination thereof. The processor 604 may include one more levels of caching, such as a level cache memory 612, one or more processor cores 614, and registers 616. The example processor cores 614 may (each) include an arithmetic logic unit (ALU), a floating point unit (FPU), a digital signal processing core (DSP Core), or any combination thereof. An example memory controller 618 may also be used with the processor 604, or in some implementations the memory controller 618 may be an internal part of the processor 604.

Depending on the desired configuration, the system memory 606 may be of any type including but not limited to volatile memory (such as RAM), non-volatile memory (such as ROM, flash memory, etc.) or any combination thereof. The system memory 606 may include an operating system 620, a communication service 622, and program data 624. The communication service 622 may include a communication module 626 and an endorsement module 627, which may be an integral part of the communication service 622 or a separate application. The communication module 626 may be configured to facilitate exchange of communications within a conversation. The endorsement module 627 may be configured to enable a recipient of an exchanged communication to select an endorsement for the exchanged communication, transmit an endorsement indication based on the selected endorsement to a sender and one or more other recipients of the exchanged communication, and enable display of the endorsement indication through communication user experiences associated with the sender and the other recipients of the exchanged communication. Program data 624 may include, among other things, endorsement data 628 related to endorsements and endorsement indications, as described herein.

The computing device 600 may have additional features or functionality, and additional interfaces to facilitate communications between the basic configuration 602 and any desired devices and interfaces. For example, a bus/interface controller 630 may be used to facilitate communications between the basic configuration 602 and one or more data storage devices 632 via a storage interface bus 634. The data storage devices 632 may be one or more removable storage devices 636, one or more non-removable storage devices 638, or a combination thereof. Examples of the removable storage and the non-removable storage devices include magnetic disk devices such as flexible disk drives and hard-disk drives (HDDs), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

The system memory 606, the removable storage devices 636 and the non-removable storage devices 638 are examples of computer storage media. Computer storage media includes, but is not limited to, RAM, ROM, EEPROM, flash memory or other memory technology, CD-ROM, digital versatile disks (DVDs), solid state drives, or other optical storage, magnetic cassettes, magnetic tape, magnetic disk storage or other magnetic storage devices, or any other medium which may be used to store the desired information and which may be accessed by the computing device 600. Any such computer storage media may be part of the computing device 600.

The computing device 600 may also include an interface bus 640 for facilitating communication from various interface devices (for example, one or more output devices 642, one or more peripheral interfaces 644, and one or more communication devices 646) to the basic configuration 602 via the bus/interface controller 630. Some of the example output devices 642 include a graphics processing unit 648 and an audio processing unit 650, which may be configured to communicate to various external devices such as a display or speakers via one or more A/V ports 652. One or more example peripheral interfaces 644 may include a serial interface controller 654 or a parallel interface controller 656, which may be configured to communicate with external devices such as input devices (for example, keyboard, mouse, pen, voice input device, touch input device, etc.) or other peripheral devices (for example, printer, scanner, etc.) via one or more I/O ports 658. An example communication device 646 includes a network controller 660, which may be arranged to facilitate communications with one or more other computing devices 662 over a network communication link via one or more communication ports 664. The one or more other computing devices 662 may include servers, computing devices, and comparable devices.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 600 may be implemented as a part of a general purpose or specialized server, mainframe, or similar computer that includes any of the above functions. The computing device 600 may also be implemented as a personal computer including both laptop computer and non-laptop computer configurations.

Example embodiments may also include methods for provision of endorsement indications in communication environments. These methods can be implemented in any number of ways, including the structures described herein. One such way may be by machine operations, of devices of the type described in the present disclosure. Another optional way may be for one or more of the individual operations of the methods to be performed in conjunction with one or more human operators performing some of the operations while other operations may be performed by machines. These human operators need not be collocated with each other, but each can be only with a machine that performs a portion of the program. In other embodiments, the human interaction can be automated such as by preselected criteria that may be machine automated.

Figure 7:
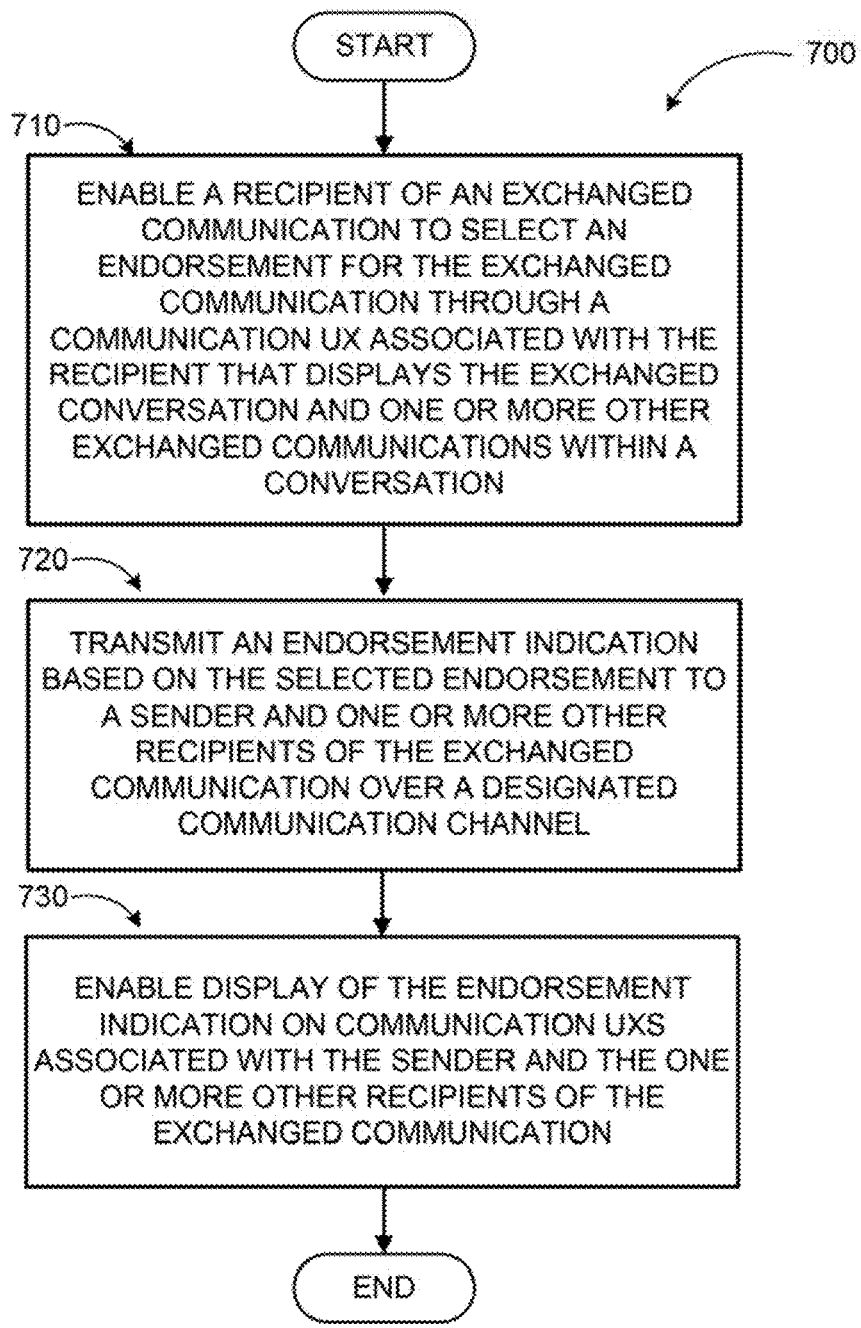
FIG. 7 illustrates a logic flow diagram for an example process to provide endorsement indications in communication environments, according to embodiments.

FIG. 7 illustrates a logic flow diagram for an example process of providing endorsement indications in a communication environment, according to embodiments. Process 700) may be implemented by one or more communication services and/or their components executed on one or more servers or other computing devices.

Process 700 begins with operation 710, where an endorsement module of a communication service may be configured to enable a recipient of an exchanged communication to select an endorsement for the exchanged communication through a communication user experience associated with the recipient that displays the exchanged communication and one or more other exchanged communications within a conversation. The endorsement may include a receipt acknowledgement and/or a social activity action associated with the exchanged communication. The social activity action may include a like, a dislike, and/or a mention, where the recipient may be enabled to select various levels of like and dislike, for example.

At operation 720, the endorsement module be configured to transmit an endorsement indication based on the selected endorsement to a sender and one or more other recipients of the exchanged communication over a designated communication channel. For example, the designated communication channel may be a control messaging channel in a transport layer of the communication service, where the endorsement indication may be distributed to individual mailboxes and/or shared mailboxes associated with the sender and the other recipient.

At operation 730, the endorsement module may be configured to enable display of the endorsement indication through communication user experiences associated with the sender and the one or more other recipients of the exchanged communication. For example, the endorsement indication may be displayed as a message or a notification. In some embodiments, the endorsement module may also enable display of an endorsement count for each exchanged communication in a communication list view and/or an endorsement count for the each conversation in a conversation list view through the communication experiences associated with the sender and the recipients. In further embodiments, an endorser list indicating names of the sender and/or the recipients selecting each of the endorsements for the exchanged communications may be displayed.

The operations included in process 700 are for illustration purposes. A communication service providing endorsement indications according to embodiments may be implemented by similar processes with fewer or additional steps, as well as in different order of operations using the principles described herein. The operations described herein may be executed by one or more processors operated on one or more computing devices, one or more processor cores, specialized processing devices, and/or general purpose processors, among other examples.

A means for provision of endorsement may include a means for enabling a recipient of an exchanged communication to select an endorsement for the exchanged communication through a communication user experience associated with the recipient that displays one or more exchanged communications within a conversation, a means for transmitting an endorsement indication based on the selected endorsement to a sender and one or more other recipients of the exchanged communication over a designated communication channel, and a means for enabling display of the endorsement indication through communication user experiences associated with the sender and the other recipients of the exchanged communication.

According to some examples, computing devices to provide endorsement indications in a communication environment at described. An example computing device may include a memory configured to store instructions, and one or more processors coupled to the memory that are configured to execute a communication service, where the communication service includes a communication module and an endorsement module. The communication module may be configured to facilitate exchange of one or more communications within a conversation. The endorsement module may be configured to enable a recipient of an exchanged communication to select an endorsement for the exchanged communication through a communication user experience associated with the recipient that displays the exchanged communications within the conversation, transmit an endorsement indication based on the selected endorsement to a sender and one or more other recipients of the exchanged communication over a designated communication channel, and enable display of the endorsement indication through communication user experiences associated with the sender and the other recipients of the exchanged communication.

In other examples, the exchanged communication is an email exchange, a meeting invite, a shared contact card, a shared task, a text message exchange, an online conference, an audio communication, a video communication, an application sharing session, a desktop sharing session, and/or a data sharing session. The endorsement may be a receipt acknowledgement or a social activity action. The social activity action may be a like, a dislike, or a mention, where the like and dislike social activity actions include one or more respective levels of like and dislike. The endorsement indication may include the recipient, the selected endorsement, the exchanged communication, a group associated with the exchanged communication, and/or a time elapsed from the selection of the endorsement. The designated communication channel may be a control messaging channel in a transport layer of the communication service.

According to some embodiments, methods executed on one or more computing devices to provide endorsement indications in a communication environment are provided. An example method may include enabling a recipient of an exchanged communication to select an endorsement for the exchanged communication through a communication user experience associated with the recipient that displays one or more exchanged communications within a conversation, transmitting an endorsement indication based on the selected endorsement to a sender and one or more other recipients of the exchanged communication over a designated communication channel, and enabling display of the endorsement indication through communication user experiences associated with the sender and the other recipients of the exchanged communication.

In other embodiments, the display of the endorsement indication may be enabled as a message or a notification. The sender and the other recipients may be enabled to preview the selected endorsement for the exchanged communication through the displayed endorsement indication. The sender and the other recipients may be enabled to navigate to the exchanged communication through selection of the displayed endorsement indication. Display of an endorsement count for the exchanged communication may be enabled in a communication list view through the communication user experiences associated with the sender, the recipient, and the one or more other recipients. An endorser list may be provided for the exchanged communication that indicates the sender, the recipient, or the other recipients that selected endorsements for the exchanged communication in response to detecting one of a hover over and a user selection of the displayed endorsement count. The endorsement count may be replaced with identifiers of the sender, the recipient, or the other recipients that selected endorsements for the exchanged communication in response to a determination that the endorsement count for the exchanged communication is less than N, where N may be a predetermined integer.

In further embodiments, display of an endorsement count for the conversation may be enabled in a conversation list view through the communication user experiences associated with the sender, the recipient, and the other recipients. One or more endorsement options may be provided for recipient selection based on past recipient interactions with the exchanged communication through the communication user experience associated with the recipient. The endorsement options provided for recipient selection may include a receipt acknowledgement, a like, an unlike, a dislike, an undislike, a mention, and a revoke mention. One or more other endorsement indications for the exchanged communication may be aggregated with the endorsement indication.

According to some examples, computer readable memory devices with instructions stored thereon to provide endorsement indications in a communication environment may be described. Example instructions may include providing endorsement options for an exchanged communication for recipient selection through a communication user experience associated with the recipient that displays one or more exchanged communications within a conversation, enabling the recipient to select an endorsement for the exchanged communication from the endorsement options, transmitting an endorsement indication based on the selected endorsement to a sender and one or more other recipients of the exchanged communication over a designated communication channel, and enabling a display of the endorsement indication through communication user experiences associated with the sender and the other recipients of the exchanged communication.

In other examples, the endorsement indication may be distributed to individual mailboxes or shared mailboxes.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A computing device to provide endorsement indications in a communication environment, the computing device comprising:
   a communication interface configured to facilitate exchange of one or more communications within a conversation;
   a memory configured to store instructions; and
   one or more processors coupled to the communication interface and the memory that are configured to execute a communication service, wherein the one or more processors are configured to:
      provide an endorsement for an exchanged communication, wherein the endorsement is displayed in conjunction with the exchanged communication through a communication user experience associated with a recipient of the exchanged communication such that the recipient can select the endorsement for the exchanged communication;
      receive a selection of the endorsement through the communication user experience;
      transmit an endorsement indication based on the selected endorsement to a sender and one or more other recipients of the exchanged communication over a designated communication channel instead of transmitting the endorsement indication as a reply or reply-all type communication for reduction of computing and communication resources, wherein:
         the designated communication channel is a control messaging channel in a transport layer of the communication service,
         the endorsement indication is transmitted as a control message that comprises an action to create the endorsement indication and metadata associated with the action that includes the selected endorsement, and
         special transport delivery agents at mailboxes of the sender and the one or more other recipients of the exchanged communication are configured to intercept the control message and process the metadata to create the endorsement indication; and
      provide the endorsement indication for display through communication user experiences associated with the sender and the one or more other recipients of the exchanged communication, wherein the endorsement indication is displayed in a notification menu of the communication user experiences.

2. The computing device of claim 1, wherein the exchanged communication is one or more of an email exchange, a meeting invite, a shared contact card, a shared task, a text message exchange, an online conference, an audio communication, a video communication, an application sharing session, a desktop sharing session, and a data sharing session.

3. The computing device of claim 1, wherein the endorsement is one or more of a receipt acknowledgement and a social activity action.

4. The computing device of claim 3, wherein the social activity action is one of a like, a dislike, and a mention.

5. The computing device of claim 4, wherein the like and dislike social activity actions include one or more respective levels of like and dislike.

6. The computing device of claim 1, wherein the endorsement indication includes one or more of the recipient, the selected endorsement, the exchanged communication, a group associated with the exchanged communication, and a time elapsed from the selection of the endorsement.

7. A method executed on a computing device to provide endorsement indications in a communication environment, the method comprising:
   providing an endorsement for an exchanged communication, wherein the endorsement is displayed in conjunction with the exchanged communication through a communication user experience associated with a recipient of the exchanged communication such that the recipient can select the endorsement for the exchanged communication;
   receiving a selection of the endorsement through the communication user experience;
   transmitting an endorsement indication based on the selected endorsement to a sender and one or more other recipients of the exchanged communication over a designated communication channel instead of transmitting the endorsement indication as a reply or reply-all type communication for reduction of computing and communication resources, wherein:
      the designated communication channel is a control messaging channel in a transport layer of a communication service,
      the endorsement indication is transmitted as a control message that comprises an action to create the endorsement indication and metadata associated with the action that includes the selected endorsement, and
      special transport delivery agents at mailboxes of the sender and the one or more other recipients of the exchanged communication are configured to intercept the control message and process the metadata to create the endorsement indication; and
   providing the endorsement indication for display through communication user experiences associated with the sender and the one or more other recipients of the exchanged communication, wherein the endorsement indication is displayed in a notification menu of the communication user experiences.

8. The method of claim 7, further comprising:
   providing the endorsement indication for display as one of a message and a notification within the notification menu of the communication user experiences.

9. The method of claim 7, further comprising:
   enabling the sender and the one or more other recipients to preview the selected endorsement for the exchanged communication through the displayed endorsement indication.

10. The method of claim 7, further comprising:
    enabling the sender and the one or more other recipients to navigate to the exchanged communication through selection of the displayed endorsement indication.

11. The method of claim 7, further comprising:
    enabling display of an endorsement count for the exchanged communication in a communication list view through the communication user experiences associated with the sender, the recipient, and the one or more other recipients.

12. The method of claim 11, further comprising:

in response to detecting one of a hover over and a user selection of the displayed endorsement count, providing an endorser list for the exchanged communication that indicates the sender, the recipient, or the one or more other recipients that selected endorsements for the exchanged communication.

13. The method of claim 11, further comprising:

in response to a determination that the endorsement count for the exchanged communication is less than N, replacing the endorsement count with identifiers of the sender, the recipient, or the one or more other recipients that selected endorsements for the exchanged communication, wherein N is a predetermined integer.

14. The method of claim 7, further comprising:

enabling display of an endorsement count for a conversation comprising the exchanged communication in a conversation list view through the communication user experiences associated with the sender, the recipient, and the one or more other recipients.

15. The method of claim 7, further comprising:

inferring one or more endorsement suggestions for the recipient of the exchanged communication based on the recipient's endorsement related interactions associated with past exchanged communications that include similar attributes to the exchanged communication, wherein the one or more endorsement suggestions include a receipt acknowledgement, a like, an unlike, a dislike, an undislike, a mention, and a revoke mention.

16. The method of claim 7, further comprising aggregating one or more other endorsement indications for the exchanged communication with the endorsement indication.

17. A computer readable memory device with instructions stored thereon to provide endorsement indications in a communication environment, the instructions comprising:

providing an endorsement for an exchanged communication, wherein the endorsement is displayed in conjunction with the exchanged communication through a communication user experience associated with a recipient of the exchanged communication such that the recipient can select the endorsement for the exchanged communication;

receiving a selection of the endorsement through the communication user experience;

transmitting an endorsement indication based on the selected endorsement to a sender and one or more other recipients of the exchanged communication over a designated communication channel instead of transmitting the endorsement indication as a reply or reply-all type communication for reduction of computing and communication resources, wherein:

the designated communication channel is a control messaging channel in a transport layer of a communication service, the endorsement indication is transmitted as a control message that comprises an action to create the endorsement indication and metadata associated with the action that includes the selected endorsement, and special transport delivery agents at mailboxes of the sender and the one or more other recipients of the exchanged communication are configured to intercept the control message and process the metadata to create the endorsement indication; and providing the endorsement indication for display through communication user experiences associated with the sender and the one or more other recipients of the exchanged communication, wherein the endorsement indication is displayed in a notification menu of the communication user experiences.

18. The computer readable memory device of claim 17, wherein transmitting the endorsement indication to the sender and the one or more other recipients of the exchanged communication over the designated communication channel comprises:

distributing the endorsement indication to one of individual mailboxes or shared mailboxes of the sender and the one or more other recipients of the exchanged communication.

* * * * *